United States Patent [19]
Johnson, Jr. et al.

[11] 3,813,167
[45] May 28, 1974

[54] LIGHT FILTER UNIT HAVING SNAP-ACTION DEVICE FOR SHIFTING FILTER MEANS INTO AND OUT OF OPERATIVE POSITION

[76] Inventors: Edgar G. Johnson, Jr., 7724 Mallard Rd., Huntsville, 35802; James J. Cornelison, Rt. 1 Box 118, Gurley, both of Ala. 35748

[22] Filed: Feb. 26, 1973

[21] Appl. No.: 335,603

[52] U.S. Cl............. 356/74, 74/97, 350/318, 356/79, 356/100
[51] Int. Cl............. G01j 3/00, G01j 3/12
[58] Field of Search............ 356/51, 74, 79, 83, 84, 356/96, 97, 98, 100; 350/315, 317, 318; 74/97; 240/3.1

[56] References Cited
UNITED STATES PATENTS

| | | | |
|---|---|---|---|
| 3,411,847 | 11/1968 | Barbieri | 350/315 |
| 3,431,054 | 3/1969 | Doonan et al. | 356/100 |
| 3,529,889 | 9/1970 | De Mey | 350/315 |

*Primary Examiner*—Ronald L. Wibert
*Assistant Examiner*—V. P. McGraw

[57] ABSTRACT

The invention described herein concerns a system for alternately shifting one or more filters into and out of the path of a light beam in an optical instrument using a light beam, such as a spectrophotometer in correlation with the wave length of the light in the beam. It also concerns a mounting means that comprises a spring under tension to shift the filter support with rapid "snap-action".

9 Claims, 4 Drawing Figures

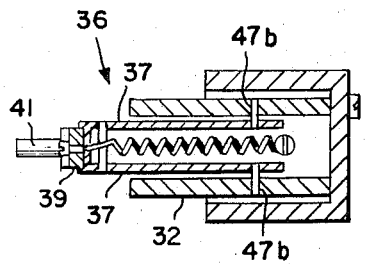
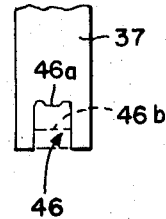
FIG. 3.  FIG. 4.
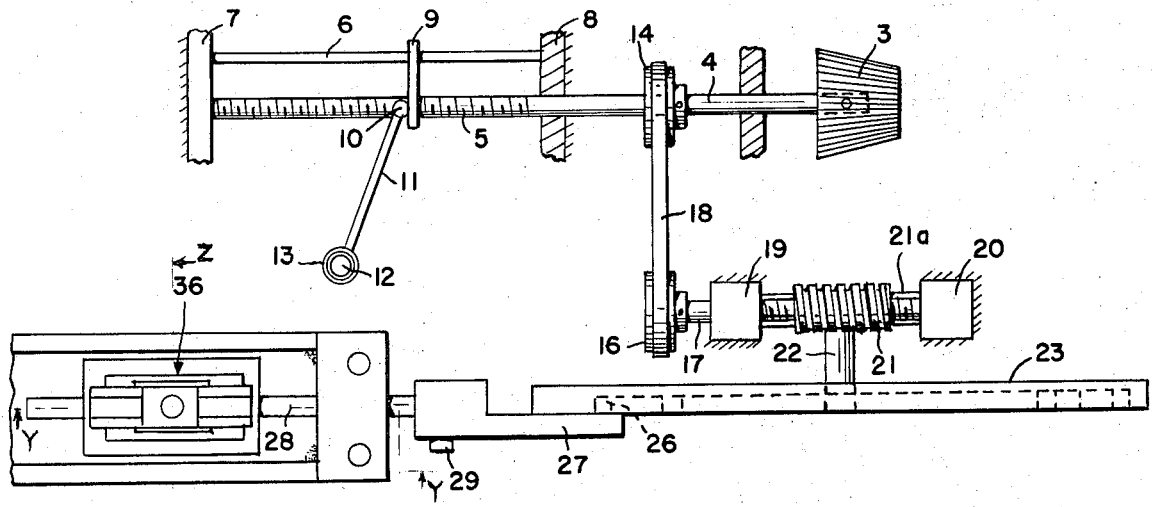
FIG. 1.
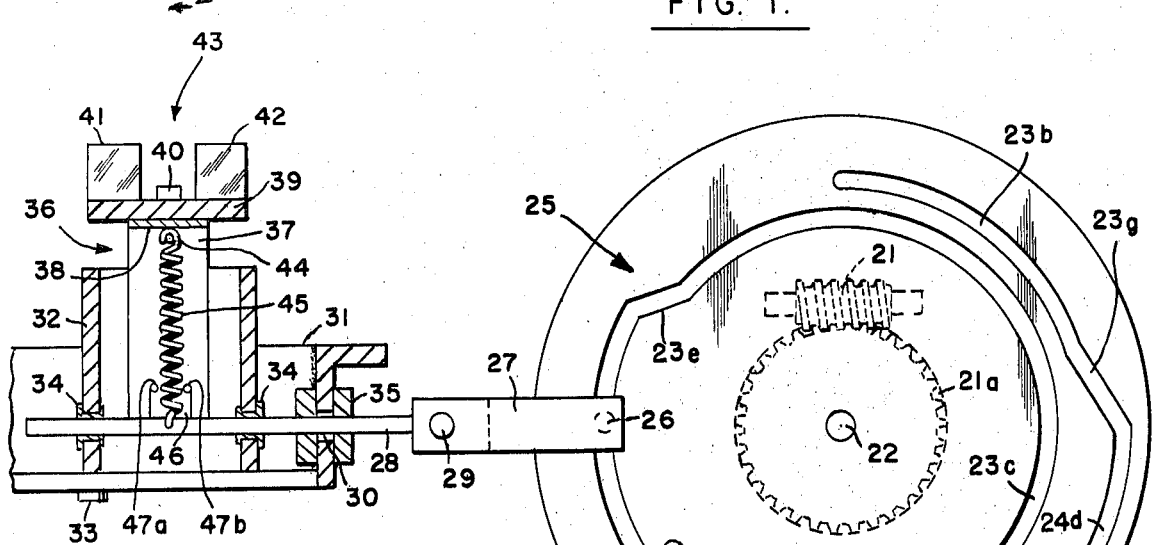
FIG. 2.

LIGHT FILTER UNIT HAVING SNAP-ACTION DEVICE FOR SHIFTING FILTER MEANS INTO AND OUT OF OPERATIVE POSITION

DESCRIPTION OF THE INVENTION

In spectrophotometers it is generally the practice to employ a monochromator to selectively predetermine the wave length of the light beam that is employed. When certain ranges of the spectrum are used it is desirable to include a filter to reduce or eliminate extraneous parasitic visible or invisible light from the beam that is passed to the sample holders, particularly when the light beam is within the red and near infrared range or in part of the ultraviolet range. For a beam having a wave length within the ordinary visible spectrum it is frequently unnecessary to employ a filter. However, it is to be understood that the present invention is not limited to the use of a filter only in the red, infrared, blue, and/or ultraviolet.

It is the primary object of the present invention to correlate the operation of a filter with a monochromator so that when the wavelength of the light beam is in one part, such as the visible part, of the spectrum, the filter system is controlled to remove any filter from the path of the light beam whereas when a beam of another wavelength, such as in the red to near infrared, is being used in the instrument, a filter, such as a red filter, is inserted. Again when the beam used has a wave length in the blue to ultraviolet, a blue or ultraviolet filter may be inserted in the path of the beam.

Other objects and advantages of the invention will be apparent from the description hereinafter.

In the drawing, which is illustrative of one embodiment of the invention,

FIG. 1 is a plan view of the filter-shifting mechanism,

FIG. 2 is a section of the filter mount taken on line Y—Y of FIG. 1,

FIG. 3 is a section of the filter mount on line Z—Z of FIG. 1, and

FIG. 4 shows a detail.

In accordance with the present invention, there is provided a mount for light filter means comprising one or a plurality of light filters so that the filter elements are mounted side-by-side and generally occupy a common plane if one disregards the fact that one of the filter elements may be of greater physical thickness than another. The filter mount is adapted to be secured to movable supporting means comprising a member to which the mount is fixed that is rockable about an axis transverse to the plane of the filter element(s) from one stable position of rest to another, spring means under tension for holding the member in its respective stable positions, and means for shifting the direction of force of the spring means from one side of an aforesaid axis to another to rock or throw the filter mount into and out of its several positions of rest.

The rockable filter mounting may be used in all sorts of optical equipment wherein it is desired to modify the light or light beam(s) as it proceeds through its operating path in such equipment. It is particularly useful in equipment, such as spectrophotometers that use a light beam of preselected wavelength band, such as may be obtained from a monochromator. The means for shifting the direction of force of the spring means may, in some instances, simply be a rod extending through a wall of the equipment housing where it is available for manual operation. However, in accordance with a preferred embodiment of the present invention, the filter means is so interconnected with a monochromator that as the latter is operated to select the wavelength of the light emitted from the monochromator, as in a spectrophotometer, the appropriate element of the filter means is automatically introduced into the path of the light beam by the operation of the wave length selection device.

The overall mechanism for operation jointly of the monochromator with the filter mounting is generally shown in FIG. 1.

A knurled knob 3 secured on rotatable shaft 4 having the screw thread 5 is used to adjust the wave length selected by the monochromator. Parallel to the screw 5 there is a guideshaft 6 fixedly mounted in suitable supports or bearings at 7 and 8. A follower member 9 has an internally threaded bore which meshes with the screw thread 5 and also has a bore having a smooth inside surface embracing the rod 6 so that is is slidable along the rod. The member 9 has an upstanding portion which engages the end 10 of the arm 11 and helical spring 6a surrounding shaft 6 urges 9 against 10. The arm 11 is fixed to a rotatably-mounted post 12. A helical spring 13, which may be fixed to the arm at one end and to a stationary support (not shown) at the other, biases the arm 11 against the member 9 at all positions of member 9 along the screw thread on shaft 4. The post is secured to a supporting frame for a diffraction grating or prism which disperses the light into a band of various component wave lengths when an initial broad-spectrum light beam impinges on it. A narrow band of any selected wave length may be taken from the dispersed band, merely by rotating the post 12 and the prism or grating carried by it relative to a fixed diaphragm opening through which the light beam passes. Such mechanism is well known and one suitable embodiment is illustrated in Swiss application 6418/72, filed Apr. 29, 1972. Other suitable monochromators are shown in U.S. Pat. Nos. 2,540,780; 2,620,444; and 2,856,531.

The rotation of knob 3 thus serves to predetermine the wavelength of the light beam issued by the monochromator. The rockable filter mount is shown at 36 and means mechanically interconnecting the wavelength selector means (comprising threaded shaft 4) with the rockable filter mounting means may comprise a pulley or sprocket 14 fixedly mounted on shaft 4, which, through a belt or chain 18, drives a pulley or sprocket 16 on shaft 17. The shaft 17 may be supported for rotation in one or more bearings, e.g. 19 and 20, and carries a worm gear 21 which engages a worm wheel 21a fixedly mounted on shaft 22. Shaft 22, suitably supported in one or more fixed bearings, carries a rotatable plate or cam 23 provided with a cam groove 25 which receives a cam follower pin or stud 26 fixedly mounted on a bar 27. A rod 28 is secured in a bore at the other end of the bar 27 by means of a set screw 29. The rod 28 extends through an aperture 30 in a fixed supporting member in the form of a receptacle 31. Within the member 31 an upwardly extending hollow supporting member 32 is secured, as by one or more screws 33. As shown, the supporting member 32 may be a hollow tube of rectangular cross-section with suitable bearings 34 in each of the end walls receiving the rod 28 for sliding movement therein. If desired, a suitable bearing for the rod 28 may also be provided at 35; it must allow reciprocation of bar 28 axially therein.

The rockable filter mounting means comprises a rocker arm 36, which takes the form of a bifurcated member or lever having two lateral plates 37 which are joined at the top by a transverse plate 38. The filter mounting base 39 is fixedly secured to the transverse plate 38, as by a screw 40. The filter mounting carries two filters 41 and 42 at the ends of the mounting with a space 43 therebetween. Two pairs of pins or studs 47a and 47b are fixed in the opposite walls of the support member 32 at the same height from the bottom of member 32, but above rod 28. Pins 47a have a common axis and pins 47b have a common axis parallel to and spaced horizontally from that of the pins 47b. The plates 37 have an aperture or notch 46 as shown in FIG. 4. This aperture is located near the bottom of the wall 37 and has an upper edge 46a which rests on pins 47a and/or 47b. Edge 46a may be flat or it may be formed with semicircular indentations at each end to conform with the cylindrical surfaces of the pins 47a and 47b. The side edges of the aperture 46 are adapted to allow the plates 37 to swing about the axis of either pair of pins 47a or 47b. If desired aperture 46 may be closed partially or entirely by a lower edge 46b (shown in dotted lines in FIG. 4) which then serves to limit the extent of swinging of the support 36 about the respective axes.

A spring 45 has one end secured to the upper end of rocker arm 36, such as by attachment to a transverse pin 44 secured in the lateral plates 37, and has its other end attached to a point on the rod 28 so that the latter end moves with the rod 28 as it reciprocates in its bearings. Spring 45 is under tension so that it urges the arm 36 against both pairs of pins 47a and 47b in the position of rest shown in FIG. 2.

One aspect of the invention is a light filter unit comprising a support 31, two laterally spaced fulcrums (axes of 47a and of 47b) on the support, the bearing surfaces of the fulcrums being parallel to each other, a lever member 36 having spaced bearing surfaces arranged to cooperate with either one or both of the fulcrum bearing surfaces, the lever member extending in a direction transversely of the plane (horizontal as viewed in FIG. 2) of the fulcrums away from that plane to one side thereof (above in FIG. 2) a distance greater than the fulcrum separation distance, one or more filters (41 and 42) carried on the lever member, a movable element 28 carried by the support and disposed in a plane on the other side of, (i.e. below in FIG. 2) and parallel to, the plane of the fulcrums, the element being reciprocable in a direction transverse of the fulcrums, spring means 45 under tension having one end attached at 44 to the lever member adjacent its end away from the plane of the fulcrums and having its other end attached to the movable element at a point such that the line of force of the spring means extends between the fulcrums when the movable element is in an intermediate position of its movement (that shown in FIG. 2) and passes beyond a respective one of the fulcrums when the element is moved into its two extreme positions, and detent means (upper edges of the upstanding end walls of 32) for limiting the throw of the lever member and filter carried thereby when the element is moved into its extreme positions. Since the spring 45 and lever 36 suddenly swing or throw the lever carrying the filter(s) into one or another position of rest, the means for doing so is appropriately termed a snap-action means or system.

In operation of the device, rotation of the cam 23 causes shifting of rod 28 through the action of the follower 26 in the cam groove 23. In the specific embodiment shown, the cam groove comprises four constant-radius sections, three of which have different radii so that as the cam rotates, the follower is shifted to the different sections of the cam groove. Two sections 23a and 23b of the cam groove have an intermediate radius and when the follower is in these sections of the groove the filter mount is in the rest position and filters 41 and 42 are in the positions shown in FIG. 2 where they are disposed one on each side of the path of the beam which passes through the space between these two filters. An inner section 23c of the groove has the smallest radius and when the cam follower passes into this section of the cam groove, the follower causes the rod 28 to shift to the right (as viewed in FIG. 2) and thereby directing the line of force of spring 45 to the right of the axis of pins 47a which causes the U-shaped member 36 to tilt or rock over pins 47a which act as a fulcrum. This causes filter 41 to swing into the path of the beam. The fourth section 24d of the cam has the greatest radius. When the follower falls into that portion of the groove, the rod 28 shifts to the left from the position shown in FIG. 2, shifting the line of force of the spring to the left of the axis of pins 47b and thereby causing the rocker arm to swing about the pins 47b as a fulcrum, thereby inserting filter 42 into the path of the beam. Each of the four constant-radius sections of the cam are connected together by changing-radius connecting or transition portions 23e, 23f, and 23g so that if the cam is rotated in either direction, the follower moves through one radial portion of the groove, then through a transition portion, and into the next portion of different radius.

The operation of the cam is thus interconnected with the angular position of post 12, as determined by the position of member 9 on the threaded shaft 4, used to select the wavelength of the light that is chosen for the light beam. This is done by rotation of the prism or diffraction grating (of the monochromator) fixedly mounted to the rotatable post 12. As shown in the drawing the follower is in the position 23a of the groove so that there is no filter inserted and the wave length of the light in the beam is in the visible region. As the knob 3 is turned to rotate post 12 to such an angle that the beam is in the red or infrared region the cam rotates in counterclockwise direction as viewed in FIG. 2 so that the follower is moved into the groove 23c which tilts the filter mounting and puts red filter 41 into the path of the beam. The extent of swing is limited by the upper edge of the end wall of support 32 against which the rocker arm is thrown.

If the beam selected by turning knob 3 reaches into the ultraviolet region the shaft 4 through the chain or belt 18 causes rotation of shaft 17 and the worm thereon in such manner as to rotate the cam in clockwise direction to bring the follower 26 into the section 24d of the cam. This causes swinging of the filter mount about the axis of pins 47b causing ultraviolet filter 42 to be interposed in the path of the beam. Again the upper edge of the other end wall of support 32 serves as a detent limiting the swing of the rocker arm 36. In some instances, and particularly in the extremely short wavelength portion of the ultraviolet region reached with some light sources, the filter absorbs too much light and for that reason when the cam is rotated clockwise as viewed in FIG. 2 as a result of selecting a beam which is in the extremely low part of the ultraviolet range, the follower 26 falls into the section 23b of the cam groove which causes the swinging of the filter mounting into the position shown in FIG. 2 wherein no filter is inserted into the light beam.

While the cam and filter shown represent one particular embodiment wherein there are three rest positions of the filter mount providing for the insertion of one or another filter as well as omission of a filter, the invention also contemplates the replacement of the blank space 43 with a filter, if desired. The nature of the filters used, that is their transmission and absorption characteristics, may be changed to suit any particular instrument or light source and the wavelength at which the tilting of the filter mount into or out of its several rest positions occurs may be changed in any way desired by replacement of the particular cam shown with another in which the constant radius and the transition grooves are redesigned as desired.

It is to be understood that changes and variations may be made without departing from the scope of the invention as defined in the appended claims.

We claim:

1. A light filter unit comprising a support, two laterally spaced fulcrums on the support, the bearing surfaces of the fulcrums being parallel to each other, a lever member having spaced bearing surfaces arranged to cooperate with either one or both of the fulcrum bearing surfaces, the lever member extending in a direction transversely of the plane of the fulcrums away from that plane to one side thereof a distance greater than the fulcrum separation distance, a filter carried on the lever member, a movable element carried by the support and disposed in a plane on the other side of and parallel to, the plane of the fulcrums, the element being reciprocable in a direction transverse of the fulcrums, spring means under tension having one end attached to the lever member adjacent its end away from the plane of the fulcrums and having its other end attached to the movable element at a point such that the line of force of the spring means extends between the fulcrums when the movable element is in an intermediate position of its movement and passes beyond a respective one of the fulcrums when the element is moved into its two extreme positions, and detent means for limiting the throw of the lever member and filter carried thereby when the element is moved into its extreme positions.

2. A light filter unit according to claim 1 in which the movable element is a reciprocable rod and the lever member carries a plurality of laterally spaced filters whose planes generally extend transversely of the fulcrums.

3. A light filter unit according to claim 2 in which the lever member is a U-shaped arm, the fulcrums are stationary pins extending inwardly from the sides of the U and the bearing surfaces of lever member are located in the sides of the U near its open end.

4. A light filter unit according to claim 3 in which the spring means comprises a helical spring having one end attached to the transverse member of the U and the other end to the reciprocable rod.

5. A light filter unit according to claim 4 in which the support has opposed members terminating in the way of the U-shaped member when it is thrown into its extreme positions, thereby serving as detent means.

6. In an instrument comprising a light source and a series of optical components including a monochromator to direct a beam of light in a path through the components, a light filter insertable into and out of the path of the light beam, and means for operating the monochromator to determine the wavelength band of the light beam issuing therefrom, the improvement wherein a. the filter is mounted on a support which is pivotable about an axis which is generally parallel to the path, but offset from, and transverse to the plane of, the filter,
 b. snap-action means is connected to the support, the snap-action means comprising spring means for swinging the filter into and out of the light path and an element movable transversely of the axis for actuating the snap-action means, the spring means being attached at one end to a point on the support on the side of the axis between the filter and the axis and at the other end to the movable element on the other side of the axis, the spring means being under tension to bias the support into positions on each side of the axis, and
 c. the monochromator operating means is interconnected to the movable element for actuating the snap-action means to automatically move the filter into and out of the path of the light beam in dependence on the wavelength thereof.

7. An instrument according to claim 6 wherein the interconnection in (c) comprises a cam.

8. In an instrument comprising a light source and a series of optical components including a monochromator to direct a beam of light in a path through the components, light filter means insertable into and out of the path of the light beam, and means for operating the monochromator to predetermine the wave length band of the light beam issuing therefrom, the improvement wherein:

a. mounting means is provided for the filter means and comprises a rockable support member, to which at least one light filter element is fixed, that is rockable about an axis generally parallel to the path and transverse to the plane of the filter element(s) from one stable position of rest to another, b. means is provided for rocking the support member comprising spring means under tension for holding the member in its respective stable positions, and means for shifting the direction of force of the spring means from one side of the axis to another to rock or throw the filter mount into and out of one of its several positions of rest,
 c. detent means is provided for limiting the extent of rocking of the support member, and
 d. the operating means for predetermining the wave length of the light issuing from the monochromator is interconnected with the filter-mount rocking means to control the insertion, and/or removal, of a light filter element into or out of the path in correlation with the wave length of the light in the beam.

9. An instrument according to claim 8 wherein a plurality of filters are carried, laterally spaced apart in a generally common plane, on the rockable support member, the member is rockable on either of two parallel axes or fulcrums transverse to the plane of the filters, one of the axes being the axis mentioned in claim 8, from an intermediate position wherein the direction of force of the spring means forces the member against the fulcrums, and the shifting means moves the direction of force of the spring past either one of the axes to thereby rock the filter support member about the respective axis into another position of rest against the detent means thereby inserting a respective filter into the path.

* * * * *